T. ROBINS.
BELT CONVEYER.
APPLICATION FILED FEB. 18, 1907.

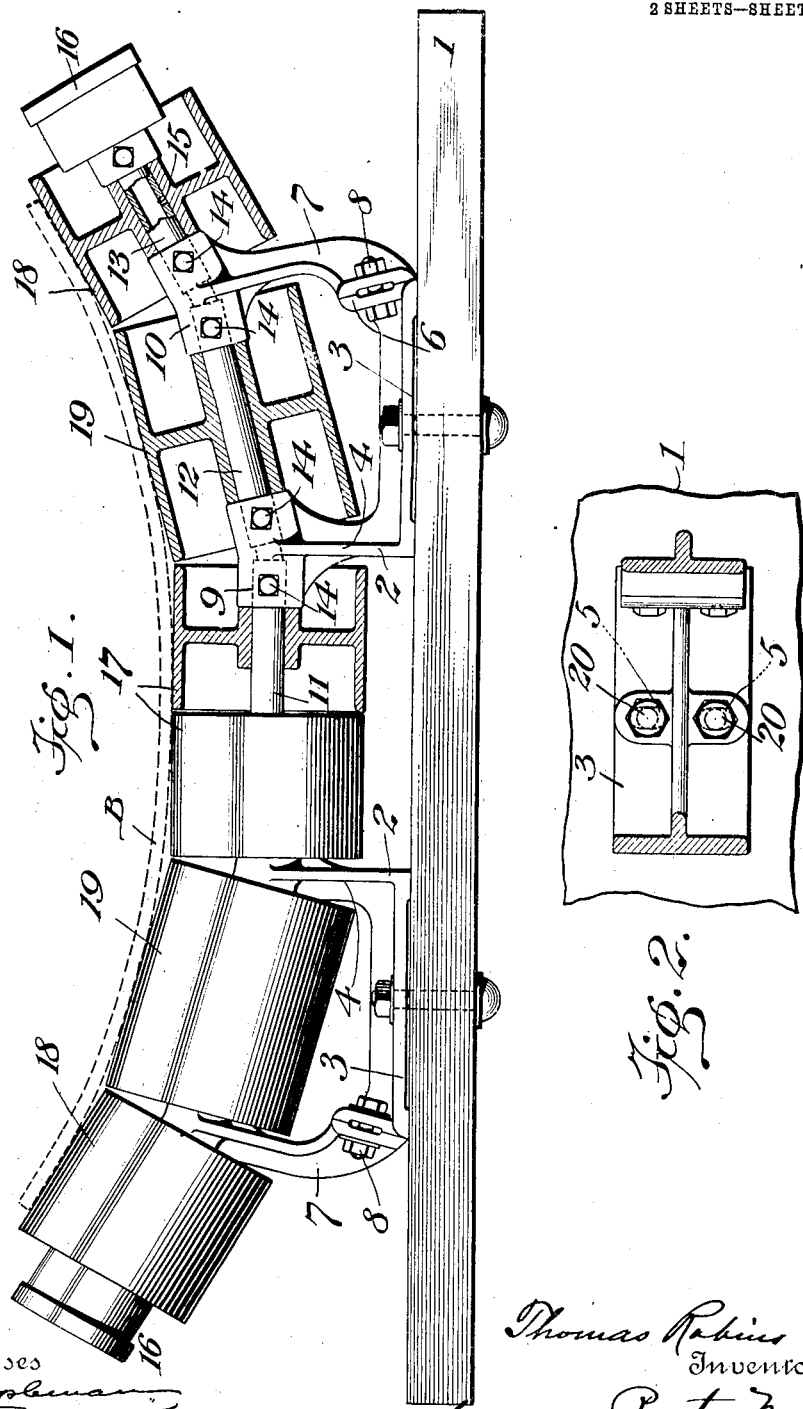

919,638.

Patented Apr. 27, 1909.
2 SHEETS—SHEET 2.

Witnesses:
R. Appleman
Louis Collins

Thomas Robins Inventor
By his Attorney Baxter Morton

UNITED STATES PATENT OFFICE.

THOMAS ROBINS, OF NEW YORK, N. Y.

BELT CONVEYER.

No. 919,638.  Specification of Letters Patent.  Patented April 27, 1909.

Application filed February 16, 1907. Serial No. 357,761.

*To all whom it may concern:*

Be it known that I, THOMAS ROBINS, a citizen of the United States, residing in the borough of Manhattan, city, county, and State of New York, have invented new and useful Improvements in Belt Conveyers, of which the following is a specification.

This invention relates to idler pulleys adapted to support conveyer belts so as to raise the edges of a belt above its middle portion, thus forming a trough in which the material carried by the belt will be retained.

The primary object of the invention is to provide idler pulleys in which the pulleys are of cylindrical form and are so arranged that a belt supported thereon will present a substantially uniform transverse curve throughout its entire width and mounted on a rigid supporting structure of such design that effective lubrication of the pulleys may be maintained at all times.

The invention also contemplates the provision of an idler pulley for conveyer belts comprising in each idler structure five or more cylindrical pulleys with their axes disposed in the same vertical plane and so mounted that the entire idler structure may be readily assembled or disassembled.

In accomplishing these objects I make use of a plurality of cylindrical pulleys turning about axes lying in the same vertical plane but arranged at slight angles to each other, so that the belt is bent very slightly between any two adjacent pulleys in the idler structure and presents no well-defined lines of flexure. The pulleys of each idler structure are mounted on tubular shaft sections rigidly secured to suitable supporting brackets of such construction that a continuous passage-way is maintained through the several shaft sections embraced in each idler structure to serve as a conduit for the lubricating material employed, which is introduced into the conduit so formed at the ends and forced through openings in the hollow shaft sections to effect the lubrication of the pulleys.

Figure 3:
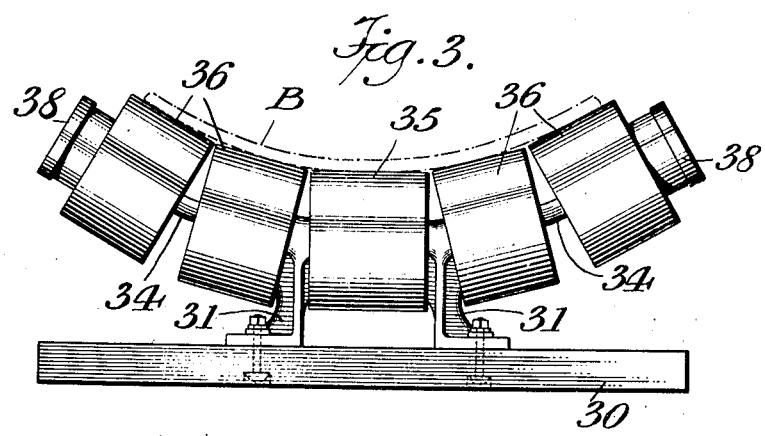
Figure 4:
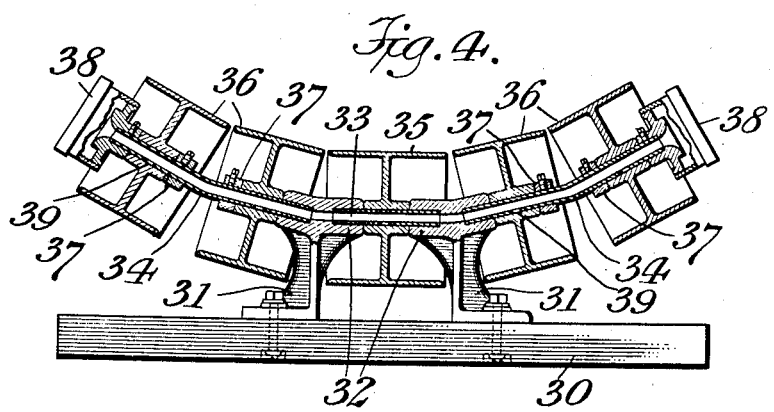

Two somewhat different idler structures embodying the invention are illustrated in the accompanying drawings; the structure illustrated in Figures 1 and 2, which show one form of the structure, being in some respects preferable to that illustrated in Figs. 3 and 4, which show a slightly different form of structure.

In Fig. 1, an idler pulley structure is illustrated in part in elevation and in part in vertical section, the conveyer belt B supported thereon being indicated in dotted lines. Fig. 2 is a detail view in section on a plane slightly inclined to the horizontal, and illustrates the structure of the base of the supporting brackets.

The idler structure illustrated in Figs. 1 and 2 is mounted on a base board 1 to which are securely bolted a pair of main brackets 2—2 each of which presents an elongated base 3 and an upright portion or standard 4. The base of each of the main brackets is characterized by a pair of oppositely placed transverse slots 5, and at the outer end of each base an abutment 6 is formed, to which an auxiliary bracket 7 is secured by bolts 8. The upright portion or standard 4 of each main bracket 2 is provided at the top with a double socket 9, and similar double sockets 10 are provided at the tops of the auxiliary brackets 7. A hollow shaft section 11 is fitted into the inner sockets 9 of the two main brackets and a slightly inclined hollow shaft section 12 is supported between each main bracket and the auxiliary bracket secured thereto. Each auxiliary bracket 7 carries in its outer socket 10 a hollow shaft section 13, which is not supported at its outer end. The double socket of each bracket is bored through so that an uninterrupted conduit is formed by the several shaft sections and the intervening portions of the supporting brackets, and the several shaft sections are secured against rotation by means of set screws 14, or the like.

The lubricating material passes out of the conduit presented by the shaft sections through suitable perforations 15 formed therein and it is forced into the conduit from grease-cups 16 fitted on the extremities of the outer shaft sections 13.

The pulleys comprised in the idler structures illustrated in Figs. 1 and 2 are of different lengths and are six in number. Two very short pulleys 17 are carried by the middle shaft section 11 and two slightly longer pulleys 18 are mounted on the outer shaft sections 13. The longest pulleys 19 are arranged between the main brackets and the auxiliary brackets, one of these pulleys turning on each of the shaft sections 12.

The entire idler structure is firmly secured to the base board 1 by means of bolts 20 passing through the base board and through the slots 5 formed in the bases of the main brackets 2.

The idler structure illustrated in Figs. 1 and 2 is characterized by great rigidity and is adapted to withstand severe strains without injury. It is, moreover, so designed that the same brackets may be used with shaft sections and pulleys of different lengths to accommodate belts of different width. For example, if it is desired to adapt the idler structure to a belt of greater width than that illustrated, it may be done by replacing the shaft sections 13 and the pulleys 18 by others of greater length, or by replacing the shaft sections 11 and the pulleys 17 by others of greater length.

A certain amount of angular adjustment of the entire idler structure on the base board is provided for by the oppositely placed transversely disposed slots 5 formed in the base portions of the main brackets 2 through which the securing bolts 20 extend. Such adjustment is very convenient when the base board is not accurately placed on the supporting structure or when the bolt holes are not accurately located, as it enables the idlers to be brought into proper position without shifting the base board.

In Figs. 3 and 4 an idler structure is illustrated in which the auxiliary brackets are dispensed with and the several shaft sections are all supported by a single pair of brackets. Fig. 3 is a view of an idler pulley structure in elevation, with the position of the belt thereon indicated in dotted lines. Fig. 4 is a view in vertical section of the idler pulley alone.

In the structure shown in Figs. 3 and 4, a base board 30 carries the entire structure, the brackets 31 being bolted to this base board. Each of the brackets has a double socket 32 at the top to afford support for the shaft sections upon which the pulleys turn. A short shaft section 33 is arranged between two brackets and a longer shaft section 34 is fitted into the outer socket of each bracket. Each of these shaft sections 34 is bent slightly approximately in the middle, so that the outer portion beyond the bend is inclined somewhat more than the inner portion. A single pulley 35 is mounted on the shaft section 33 and a pair of pulleys 36 are supported upon each of the shaft sections 34, being kept out of contact with each other by set collars 37 adjustably mounted on the shaft sections. The shaft sections 33 and 34 are hollow and form, together with the intervening portions of the supporting brackets, an uninterrupted passage or conduit for lubricating material which is supplied from grease-cups 38 fitted on the outer ends of the shaft sections 34. These grease-cups are of the ordinary compression type and are secured in any suitable manner. The lubricant passes out of the conduit formed by the shaft sections through small apertures 39 formed at suitable intervals.

The idler structure illustrated in Figs. 3 and 4 is less rigid and less adapted to withstand severe strains than that illustrated in Figs. 1 and 2, but is somewhat less expensive, and supports the belt in the same way, preventing the formation of well-defined lines of flexure in the belt in imparting to the belt the substantially uniform transverse curvature throughout its entire width.

In order to adapt the idler structure shown in Figs. 3 and 4 to belts of different widths, the shaft sections 34 may be replaced by longer or shorter sections, as desired, together with pulleys of corresponding lengths.

Having now particularly described and ascertained the nature of my said invention and in what manner the same is to be performed, I declare that what I claim is:

1. An idler pulley structure for belt conveyers having two inner brackets, a pulley supported between them, auxiliary or side brackets each forming an extension of and removably mounted or secured to one of said inner brackets, pulleys supported between the inner and the auxiliary or side brackets, and means for securing the said brackets to a suitable support therefor, and inclined shafts mounted in and extending outward from the auxiliary or side brackets with pulleys mounted thereon.

2. In an idler pulley structure for belt conveyers, the combination with a plurality of separate supporting brackets, of a plurality of auxiliary brackets removably secured to and wholly supported on said supporting brackets, a hollow shaft section supported between said supporting brackets, hollow shaft sections supported between said auxiliary brackets and said supporting brackets, hollow shaft sections projecting beyond said auxiliary brackets and supported at an angle to said intermediate shaft sections, and cylindrical belt supporting pulleys mounted on each of said shaft sections.

3. An idler pulley structure for belt conveyers, having two main or inner brackets and a pulley supported between them, means for adjusting each one of the said main or inner brackets upon a common support for the two, and two auxiliary or side brackets each of which is secured to and is adjustable with one of the main or inner brackets, and pulleys supported between the main or inner brackets and the auxiliary or side brackets.

4. An idler pulley structure for belt conveyers, having two main or inner brackets and a pulley supported between them, means for adjusting each one of the said main or inner brackets upon a common support for the two, and two auxiliary or side brackets each of which is secured to and is adjustable with one of the main or inner brackets, and pulleys supported between the main or inner brackets and the auxiliary or side brackets, outwardly projecting shafts rigidly mounted on the auxiliary or side brackets, and pulleys loosely turning on the said shafts.

5. An idler pulley structure for belt conveyers, having two main or inner brackets and a suitable support to which the said brackets are secured, a pulley mounted between the said brackets, a pair of auxiliary or side brackets each removably mounted on and secured to one of the said main or inner brackets, shafts extending between the said auxiliary or side brackets and the main or inner brackets and rigidly secured to each, and pulleys loosely turning upon the last said shafts.

In testimony whereof, I have signed my name in the presence of two witnesses.

THOMAS ROBINS.

Witnesses:
 REGINA G. MORAN,
 ROSCOE L. PETERSON.